(12) United States Patent
Imai

(10) Patent No.: US 8,687,498 B2
(45) Date of Patent: Apr. 1, 2014

(54) ROUTING DEVICE, METHOD, AND PROGRAM

(75) Inventor: Satoshi Imai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 312 days.

(21) Appl. No.: 13/030,492

(22) Filed: Feb. 18, 2011

(65) Prior Publication Data

US 2011/0205901 A1  Aug. 25, 2011

(30) Foreign Application Priority Data

Feb. 23, 2010  (JP) .................................. 2010-37546

(51) Int. Cl.
*H04W 4/00* (2009.01)
(52) U.S. Cl.
USPC ............ 370/238; 370/229; 370/235; 370/248
(58) Field of Classification Search
USPC ........................ 370/229–231, 235, 238, 248
See application file for complete search history.

(56) References Cited

U.S. PATENT DOCUMENTS

| | | | |
|---|---|---|---|
| 6,665,271 B1 * | 12/2003 | Thomas et al. ............... | 370/252 |
| 6,898,437 B1 * | 5/2005 | Larsen et al. ................. | 455/522 |
| 7,633,873 B1 * | 12/2009 | Kohler et al. ................. | 370/238 |
| 7,869,359 B2 * | 1/2011 | Kohler et al. ................. | 370/231 |
| 8,102,761 B2 * | 1/2012 | Yamaguchi et al. .......... | 370/225 |

FOREIGN PATENT DOCUMENTS

| | | |
|---|---|---|
| JP | 5-268250 | 10/1993 |
| JP | 2003-527039 | 9/2003 |
| JP | 2007-142609 | 6/2007 |
| WO | WO 00/65783 | 11/2000 |
| WO | WO 01/69866 | 9/2001 |
| WO | WO 2006/001820 | 1/2006 |

OTHER PUBLICATIONS

"Japanese Office Action" mailed by JPO and corresponding to Japanese Application No. 2010-037546 on Jun. 25, 2013, with partial English Translation.

* cited by examiner

*Primary Examiner* — Phuc Tran
(74) *Attorney, Agent, or Firm* — Fujitsu Patent Center

(57) ABSTRACT

A routing apparatus that determines a path for a flow in a network including a plurality of data links, the routing apparatus including: a constraint condition setting unit configured to generate a constraint condition that has a requirement that an end-to-end quality requirement of the flow is satisfied based on a quality variation occurring in each of the data links owing to the allocation of the flow to each of the data links and another requirement that an end-to-end quality requirement of another flow existing in each of the data links is satisfied based on a quality variation occurring in the another flow owing to the allocation of the flow to each of the data links; and a routing unit configured to determine the path for the flow from among a plurality of paths including the data links within a range satisfying the constraint condition.

14 Claims, 14 Drawing Sheets

FIG. 13

| LINK ATTRIBUTE | LINK1 | LINK2 | LINK3 | LINK4 | ... |
|---|---|---|---|---|---|
| LINK CAPACITY(10^6 bps) | 100 | 100 | 100 | 100 | |
| CURRENT TRANSFER TRAFFIC AMOUNT(10^6 bps) | 30 | 60 | 50 | 75 | |
| CURRENT DELAY AMOUNT(SEC) | fd(0.3) | fd(0.6) | fd(0.5) | fd(0.75) | |
| CURRENT LOSS RATE(0~1) | fl(0.3) | fl(0.6) | fl(0.5) | fl(0.75) | |
| INCREASED AMOUNT OF FLOW REQUEST-TIME TRAFFIC AMOUNT(10^6 bps) | 10 | 10 | 10 | 10 | |
| FLOW REQUEST-TIME PREDICTED TRAFFIC AMOUNT(10^6 bps) | 40 | 70 | 60 | 85 | |
| FLOW REQUEST-TIME PREDICTED DELAY AMOUNT(SEC) | fd(0.4) | fd(0.7) | fd(0.6) | fd(0.85) | |
| INCREASED AMOUNT OF FLOW REQUEST-TIME PREDICTED DELAY AMOUNT(SEC) | fd(0.4)-fd(0.3) | fd(0.7)-fd(0.6) | fd(0.6)-fd(0.5) | fd(0.85)-fd(0.75) | |
| FLOW REQUEST-TIME PREDICTED LOSS RATE(0~1) | fl(0.4) | fl(0.7) | fl(0.6) | fl(0.85) | |
| INCREASED AMOUNT OF FLOW REQUEST-TIME PREDICTED LOSS RATE(0~1) | fl(0.4)-fl(0.3) | fl(0.7)-fl(0.6) | fl(0.6)-fl(0.5) | fl(0.85)-fl(0.75) | |

US 8,687,498 B2

ROUTING DEVICE, METHOD, AND PROGRAM

CROSS-REFERENCE TO RELATED APPLICATION

This application is based upon and claims the benefit of priority from the prior Japanese Patent Application No. 2010-37546 filed on Feb. 23, 2010, the entire contents of which are incorporated herein by reference.

FIELD

The present invention relates to a technique in which a path for a flow is determined in a network including a plurality of nodes coupled through data links.

BACKGROUND

In a network that includes a plurality of nodes and a number of links individually establishing couplings between nodes, a network management system (NMS) coupled to individual nodes determines paths on the network and accommodates (assigns) flows.

Specifically, in response to a flow setting request relating to data transmission from a transmission source node to a transmission destination node, the path design function of the network management system determines a path and accommodates a flow in accordance with constraint conditions such as a reachability condition, traffic capacity, a path length (hop count), and the like. In addition, the term "flow" is a flow of data, and may be translated into "session" or "path".

In a path design method of the related art, for example, there has been known a technique in which a path minimizing a link cost between nodes is determined as an optimum path from among paths having a plurality of patterns. An example of documents that disclose such a technique is Japanese Unexamined Patent Application Publication (Translation of PCT Application) No. 2003-527039.

SUMMARY

According to an aspect of the invention, a routing apparatus that determines a path for a flow in a network including a plurality of nodes coupled through a plurality of data links, the routing apparatus including: a constraint condition setting unit configured to generate a constraint condition that has a requirement that an end-to-end quality requirement of the flow is satisfied based on a quality variation occurring in each of the data links owing to the allocation of the flow to each of the data links and another requirement that an end-to-end quality requirement of another flow existing in each of the data links is satisfied based on a quality variation occurring in the another flow owing to the allocation of the flow to each of the data links; and a routing unit configured to determine the path for the flow from among a plurality of paths including the data links within a range satisfying the constraint condition set by the constraint condition setting unit.

The object and advantages of the invention will be realized and attained by at least the elements, features, and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 13 is a diagram exemplifying link attribute information generated in a network management system as an example of an embodiment.

DESCRIPTION OF EMBODIMENTS

In such a routing method of the related art as described above, a path is determined by providing, as constraint conditions, traffic usage restrictions and the like in individual links on which paths are superposed. In such constraint conditions, it is not clear what acceptable level for network utilization is necessary for assuring the end-to-end quality of each flow accommodated by a network, and it is necessary to perform path calculation under provided strict constraint conditions.

In addition, in the routing method of the related art, in a case in which a path is calculated for a new flow, if path calculation is performed in view of the end-to-end quality of individual flows having various path lengths and various quality requirements, it is necessary to achieve the path calculation by searching all patterns for all path candidates. Namely, in addition to a huge amount of calculation and a lot of time necessary for the calculation, there is a problem that a processing operation may break down owing to a network configuration including a number of nodes.

An object of the present embodiments, in view of such a problem as described above, is to make an optimum path calculation available in which an optimum path is obtained with a realistic calculation amount in view of the end-to-end quality of a flow when a path is determined for the flow.

In addition, the object of the present application is not limited to the above-mentioned object but a function effect, which is derived by each of configurations illustrated in embodiments described later and is not derived by a technique of the related art, can also be positioned as another object of the present invention.

An embodiment relating to path determination will be described with reference to figures, hereinafter.

Figure 1:
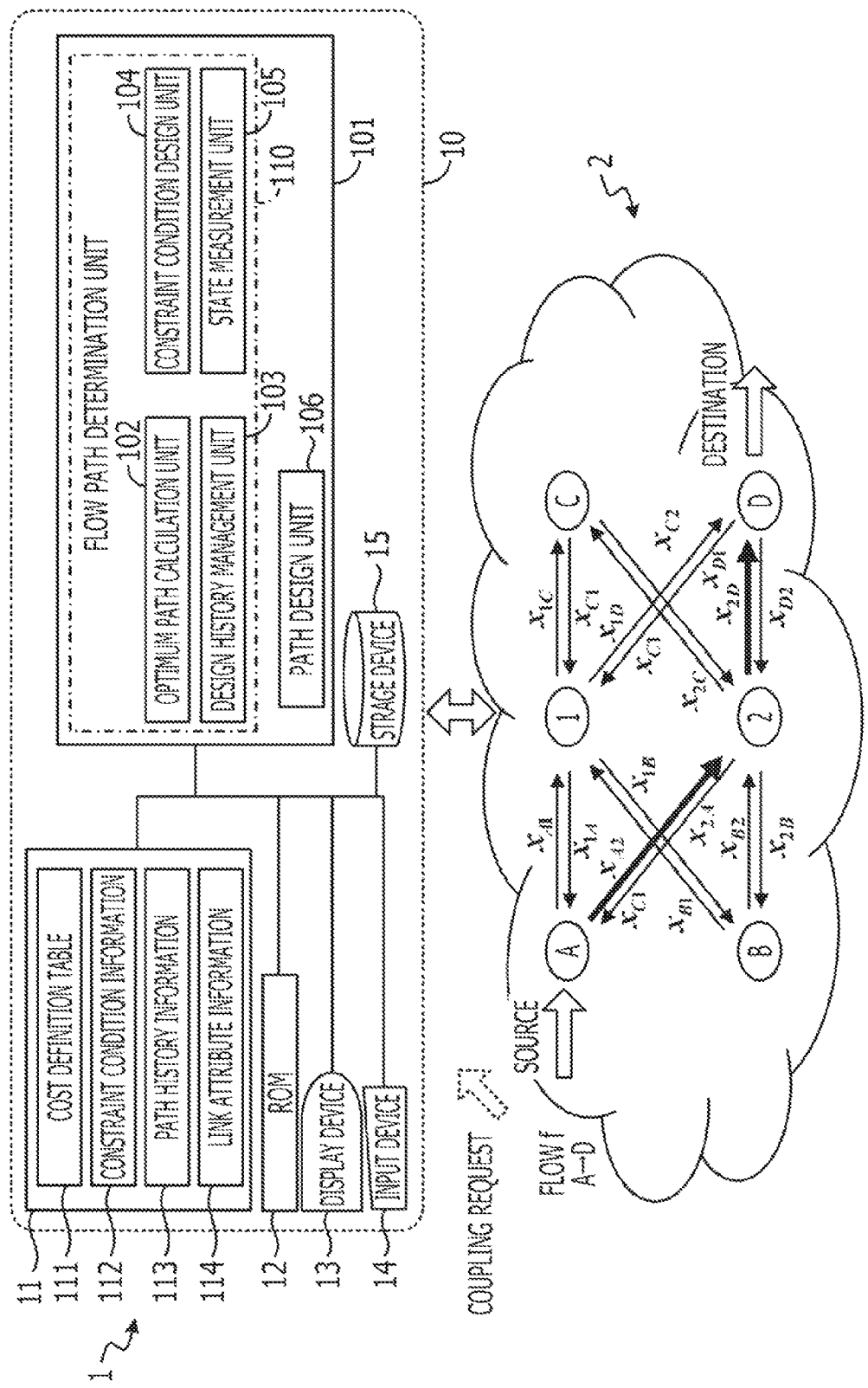
FIG. 1 is a diagram schematically illustrating a configuration of a network management system as an example of an embodiment.
Figure 2:
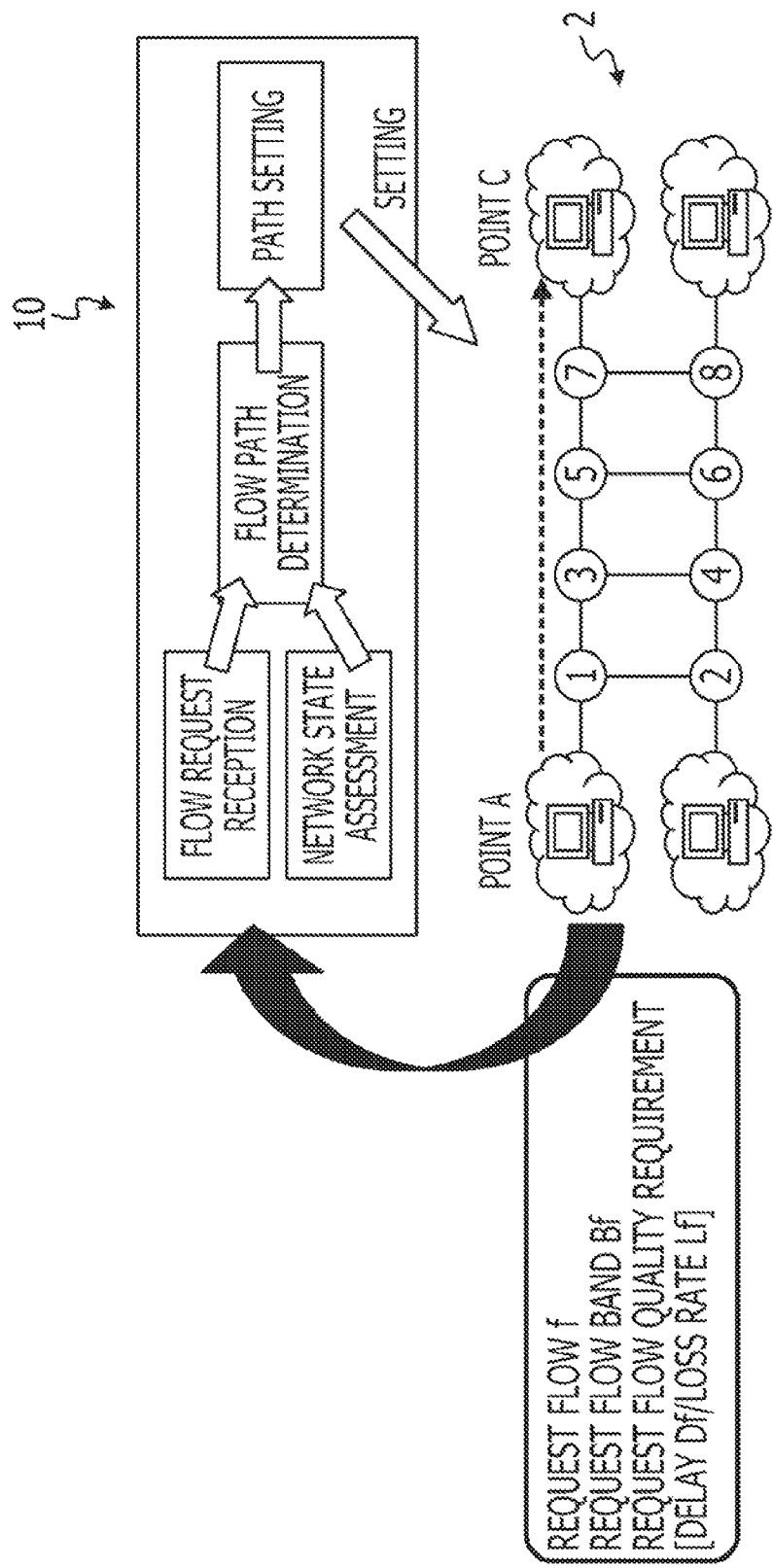
FIG. 2 is a diagram for explaining a function of a management server in a network management system as an example of an embodiment.

FIG. 1 is a diagram schematically illustrating the configuration of a network management system 1 as an example of the embodiment, and FIG. 2 is a diagram for explaining the function of a management server 10 in the network management system 1.

The network management system 1 manages a network 2 including a plurality of nodes coupled through data links, and includes the management server 10 as illustrated in FIG. 1.

The network 2 includes the plural nodes, and includes data links establishing couplings between these nodes so that the nodes can communicate with one another.

The nodes are computer systems that can individually receive and transmit data from and to other nodes through data links.

In addition, each node can function as a transmission source node that is a source for data to be transmitted to the network 2, and can also function as a reception node (transmission destination node) that is a destination for receiving data transmitted from a transmission source node. In addition, each node also includes a function for receiving data from the transmission source node or another node and further transmitting (transferring) the received data to another node. In addition, in the present embodiment, the detailed descriptions of the configurations and functions of these nodes will be omitted as a matter of practical convenience.

For example, the data link is a communication line (transmission path) such as a local area network (LAN), a fibre channel (FC), or the like. In addition to a physical line used for transmitting data, the data link includes a hardware component and a software component, which are used for transmitting and receiving data in a data network. In addition, communication lines having various kinds of existing standards can be applied to the data link. In addition, in the present embodiment, the detailed descriptions of the configurations and functions of these data links will be omitted as a matter of practical convenience. In addition, in some cases, the data link is simply called "link".

In the example illustrated in FIG. 1, an example in which the network 2 includes six nodes is illustrated, and symbols A, B, C, D, 1, and 2 are assigned to these nodes to indicate them.

In addition, hereinafter, the symbols for identifying these nodes are referred to as node numbers. In addition, hereinafter, in a case in which a node is indicated, when an arbitrary node is indicated, the node is simply phrased as "node". On the other hand, when it is necessary to identify one of a plurality of nodes, the node is indicated with a node number. For example, in some cases, a node having a node number A is expressed as a node A, and a node having a node number 1 is expressed as a node 1.

In addition, in the example illustrated in FIG. 1, a data path (data link) between nodes coupled to each other by a data link is expressed using a symbol x, and the transmission direction of data is indicated by assigning to the symbol x the node numbers of individual nodes forming both ends of the path. In more detail, the node number of the transmission source of data and the node number of the transmission destination of data are arranged in this order, assigned to the symbol x, and expressed as subscript symbols, and hence a data path in the data link is indicated with accompanying the transmission direction of data.

For example, a symbol $x_{A2}$ indicates a path through which data is transmitted from a node A to a node 2, and a symbol $x_{2D}$ indicates a path through which data is transmitted from a node 2 to a node D.

In addition, hereinafter, in some cases, the data link is indicated using a symbol (i, j). In this regard, however, both "i" and "j" are node numbers located at both ends of the data link, respectively.

The management server 10 manages transmission paths of data in the network 2, and is directly or indirectly coupled to individual nodes included in the network 2. The management server 10 functions as a routing device that determines a path for a flow in the network 2 including the plural nodes coupled to one another through the data links.

In addition, the management server 10 is a computer (information processing device) including a server function, and, as illustrated in FIG. 1, includes a CPU 101, a display device 13, a RAM 11, a ROM 12, an input device 14, and a storage device 15.

The display device 13 presents information to an operator by displaying various kinds of information, and is a liquid crystal display or a cathode ray tube (CRT) display, for example. The input device 14 is a device used by the operator for inputting various instructions and data, and is a keyboard, a mouse, or the like.

The random access memory (RAM) 11 is a storage device temporarily storing data and programs (a network management program and a routing program), and is used for deploying (storing) data and programs when the CPU 101 described later performs various kinds of calculation and control operations.

In addition, the RAM 11 stores a cost definition table 111, constraint condition information 112, path history information 113, and link attribute information 114.

The cost definition table 111 is used for storing the costs (link costs) of individual data links (i, j) included in the network 2, and stores preliminarily set link costs $c_{i,j}$ therein with associating the link costs $c_{i,j}$ with the individual data links (i, j). In addition, the link cost can be obtained using various kinds of existing methods, and hence the detailed descriptions thereof will be omitted.

The constraint condition information 112 is a quality constraint condition set by a constraint condition design unit 104 described later. In addition, the detailed description of the quality constraint condition will be described later.

The path history information 113 is information relating to an optimum path determined by an optimum path calculation unit 102 described later, and associates identification information, which identifies a flow, with a usage bandwidth, a quality requirement for an end-to-end delay (buffering delay), and a quality requirement for a loss rate (packet loss rate), which relate to the flow, and information indicating an optimum path, for example. Namely, the RAM 11 functions as a path history information storage unit that stores, as path history information, information relating to data links forming a path for a flow, determined by the optimum path calculation unit 102.

The link attribute information 114 is information generated when the constraint condition design unit 104 sets the quality constraint condition. The detail of the link attribute information 114 will be described later with reference to FIG. 13.

In addition, the RAM 11 also stores a request flow f (the detail thereof will be described later) transmitted from a transmission source node, and the request flow f can be read out from the optimum path calculation unit 102, a design history management unit 103, the constraint condition design unit 104, and the like, described later.

The read only memory (ROM) 12 is a storage device storing data and programs. The storage device 15 is a storage device storing data and programs, and is a hard disk drive (HDD), a solid state drive (SSD), or the like, for example.

In addition, the storage device 15 stores various kinds of programs and data such as an operating system (OS) and the like. In addition, at least a part of the cost definition table 111, the constraint condition information 112, the path history information 113, the link attribute information 114, and the request flow f, described above, may be stored in the storage device 15 in place of the RAM 11.

The CPU 101 is a processing device that executes various kinds of calculation operations and control operations by executing a program stored in the ROM 12 or the storage device 15, and realizes various functions. In the present embodiment, the CPU 101 executes the network management program, and hence, as illustrated in FIG. 1, functions as a flow routing unit 110 (the optimum path calculation unit 102, the design history management unit 103, the constraint condition design unit 104, and a state measurement unit 105) and a path design unit 106.

Namely, in the management server 10, the CPU 101 functions as the flow routing unit 110 and the path design unit 106, and hence receives the request flow (design flow) f from a transmission source node (point A), determines an optimum path (flow path) for the flow, and sets a path, as illustrated in FIG. 2.

Incidentally, in addition to transmitted data, the request flow f from the transmission source node includes a requested flow bandwidth Bf and a requested flow quality requirement. The requested flow bandwidth Bf is the usage bandwidth (traffic amount) of the transmitted data, and is expressed in units of bits per second (bps) or the like, for example. In addition, the requested flow bandwidth Bf indicates a traffic amount (the increased amount of traffic) that is increased in a data link by transmitting the request flow f through the data link.

The quality requirement of the request flow (quality requirement) is information indicating end-to-end quality necessary for the request flow f, and includes delay information Df and a loss rate Lf. The delay information Df is information indicating an allowable delay level for the request flow f, and is indicated in units of seconds, milliseconds, or the like, for example. The loss rate Lf is information indicating an allowable loss rate (packet loss rate) for the request flow f, and is indicated using a value ranging from 0 to 1, for example. In addition, the loss rate may be indicated using another unit such as percent or the like.

In addition, the requested flow bandwidth Bf and the requested flow quality requirement are stored in a predetermined storage area in a storage device such as the RAM 11 or the like.

The path design unit 106 sets on a network a path (optimum path) determined by the flow routing unit 110 so as to transmit the request flow f. In addition, the function as the path design unit 106 can be realized using various existing methods, and hence the detailed descriptions thereof will be omitted.

The flow routing unit 110 determines a data link to be a path, on the basis of the request flow f from the transmission source node, and determines an optimum path X for the request flow f when receiving a flow request from a transmission source node (source node) that intends to add a new path. In addition, the transmission source node may be a terminal coupled to the node.

As illustrated in FIG. 1, the flow routing unit 110 includes the optimum path calculation unit 102, the design history management unit 103, the constraint condition design unit 104, and the state measurement unit 105.

The state measurement unit 105 assesses the state of the network 2, and measures each transfer traffic amount (traffic amount or link traffic load) $R_{i,j}$ in each data link (i, j) in the network 2. The state measurement unit 105 may measure and obtain the traffic amount in the data link, and also calculate and obtain the traffic amount on the basis of information or the like included in the request flow f for each data link. Namely, the state measurement unit 105 can realize the measurement of the traffic amount $R_{i,j}$ in each data link (i, j) using various existing methods.

In addition, for example, the state measurement unit 105 stores each measured transfer traffic amount in a predetermined storage area in the RAM 11 or the storage device 15 (refer to FIG. 13). In addition, each measured transfer traffic amount stored in the RAM 11 is read out by the constraint condition design unit 104 described later, and is used for setting a constraint condition.

The constraint condition design unit (constraint condition setting unit) 104 sets a constraint condition used for path determination performed by the optimum path calculation unit 102. Using a current traffic amount in a data link and the bandwidth information of the request flow f, the constraint condition design unit 104 designs constraint condition expressions for the request flow f and another already-set flow on the basis of quality requirements provided for the request flow f and the other flow (the other already-set flow) existing in the network 2.

The constraint condition design unit 104 estimates end-to-end quality influence for the request flow f and the other flow existing in the network 2 on the basis of traffic influence (load change) in individual data links due to the request flow f. In addition, the constraint condition design unit 14 sets, as constraint conditions, linear constraint equations relating to the end-to-end quality of the request flow f and the other flow.

Namely, the constraint condition design unit 104 approximately formulates, as linear equations, the end-to-end loss rates and end-to-end delays of the request flow f and the other flow on the basis of relationship models of "a load and a delay" and "a load and a packet loss rate" in each data link in the network 2.

Figure 3:
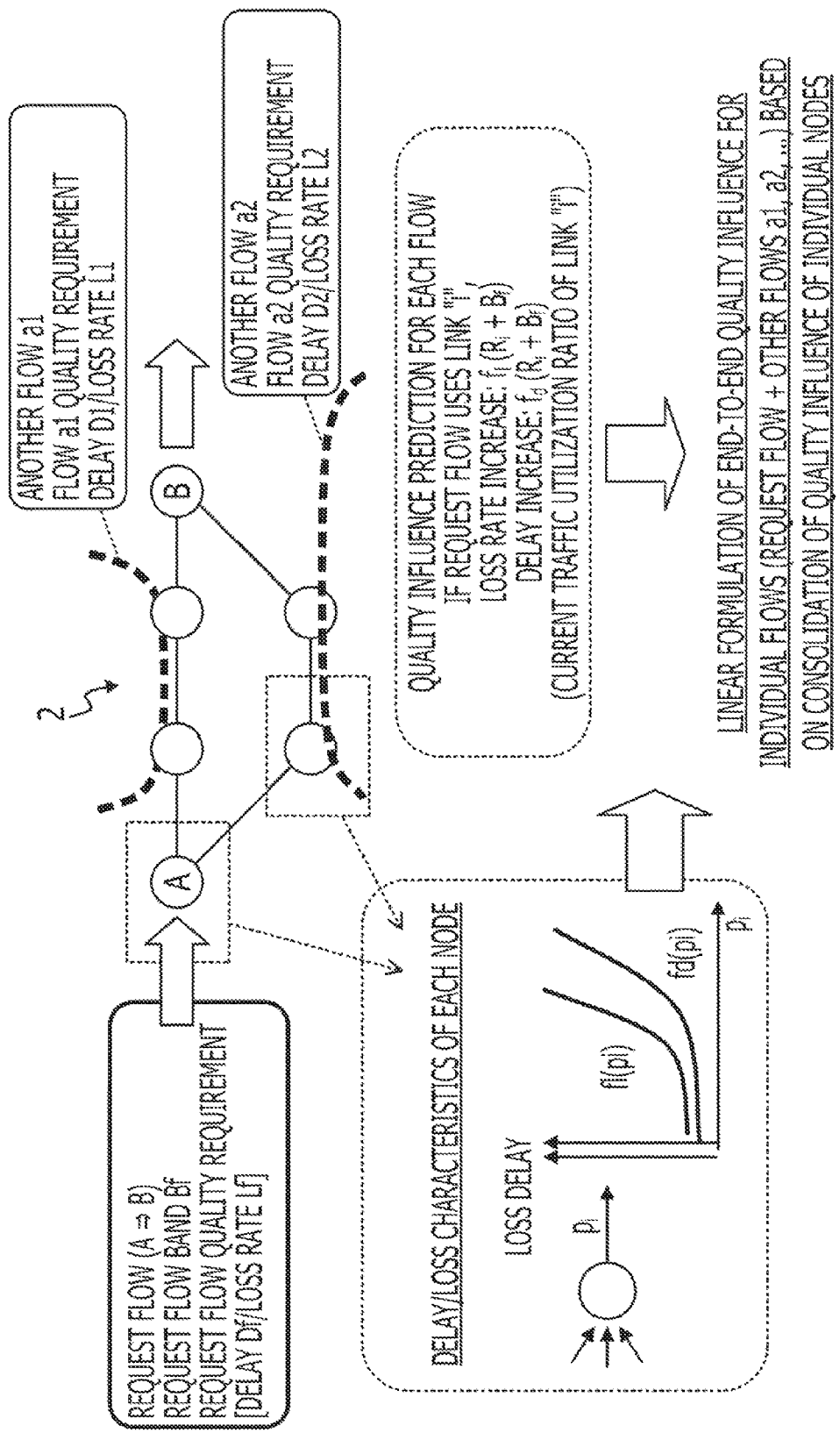
FIG. 3 is a diagram for explaining a setting method for a constraint condition performed in a constraint condition design unit in a network management system as an example of an embodiment.

FIG. 3 is a diagram for explaining a setting method for a constraint condition performed in the constraint condition design unit 104 in the network management system 1 as an example of the embodiment, and schematically illustrates an example of the configuration of the topology of the network 2.

In the example illustrated in FIG. 3, under an environment in which two flows, a flow a1 and a flow a2, (other flows or other already-set flows) have been set previously, it is assumed that a setting request (flow setting request) for a new request flow f to travel from a node A to a node B occurs.

Here, with respect to the already-set flow a1, a delay D1 is provided as a quality requirement for an end-to-end delay, and a loss rate L1 is provided as a quality requirement for an end-to-end loss rate. In addition, with respect to the already-set flow a2, a delay D2 is provided as a quality requirement for an end-to-end delay, and a loss rate L2 is provided as a quality requirement for an end-to-end loss rate.

Furthermore, also with respect to the request flow f, a usage bandwidth Bf, an end-to-end delay quality requirement Df, and an end-to-end loss rate quality requirement Lf are provided at the time of a flow setting request.

The constraint condition design unit 104 sets, for the request flow f, constraint conditions derived in view of "quality for a request flow" and "quality influence for another flow", the constraint conditions being used by the optimum path calculation unit 102 described later for identifying a path in which the summation of link cost values becomes minimum.

It may be necessary for the constraint condition derived in view of "quality for a request flow" to satisfy quality requirements for an end-to-end delay and an end-to-end loss rate for the request flow.

In addition, it may be necessary for the constraint condition derived in view of "quality influence for another flow" to satisfy quality requirements for an end-to-end delay and an end-to-end loss rate for the other already-set flow. Namely, it may be necessary to satisfy quality requirements for an end-to-end delay and an end-to-end loss rate for the flow a1 and satisfy quality requirements for an end-to-end delay and an end-to-end loss rate for the flow a2.

In addition, in the present method, the constraint condition design unit 104 sets the above-mentioned constraint conditions as linear expressions, and the optimum path calculation unit 102 calculates an optimum path for the request flow f, as a form of a linear programming problem.

Specifically, the constraint condition design unit 104 estimates and manages the characteristics of "a link traffic load and a buffering delay" and "a link traffic amount and a loss rate" in each node. Here, for example, the characteristics of "a link traffic load and a buffering delay" and "a link traffic amount and a loss rate" can be calculated using a quality variation prediction function such as a queuing model or the like, typified by M/M/1/K.

Namely, the constraint condition design unit 104 also includes a function as a quality influence estimation unit that estimates quality influence (end-to-end quality influence) occurring owing to the allocation of the request flow f to a data link.

Figure 4:
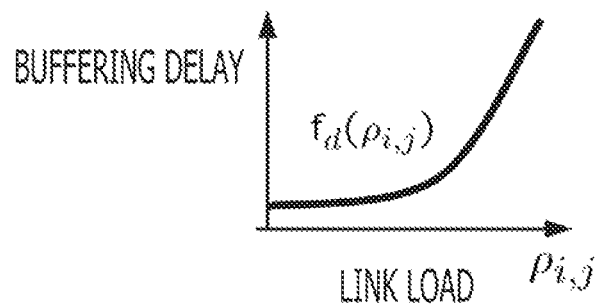
FIG. 4 is a diagram illustrating a relationship between a link traffic load and a buffering delay.
Figure 5:
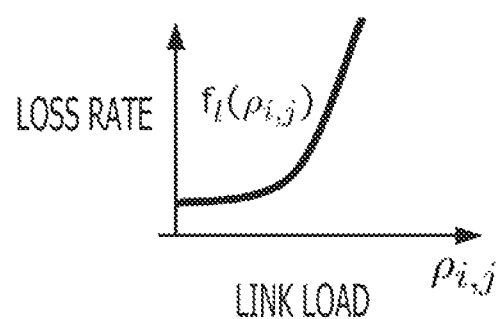
FIG. 5 is a diagram illustrating a relationship between a link traffic load and a loss rate.

FIG. 4 is a diagram illustrating a relationship between a link traffic load (link load) and a buffering delay, and FIG. 5 is a diagram illustrating a relationship between a link traffic load (link traffic amount) and a loss rate.

The buffering delay is indicated using a characteristic function $f_d$ of the link traffic load and the buffering delay as illustrated in FIG. 4. In addition, the loss rate is indicated using a characteristic function $f_l$ of the link traffic load and the loss rate as illustrated in FIG. 5. For example, a buffer length of a network device: K (unit: packets)
an average packet length: data (unit: bits)
line capacity when a request flow f flows into a data link (i, j): Ci,j (unit: bps)

Here, it is assumed that a node or the like, the line capacity of a link corresponding to which dynamically changes in response to the traffic amount of each link, is a target of the present invention.

When the load of a link (i, j): ρi,j [0 to 1]=a transfer traffic amount (unit: bps)/Ci,j, the buffering delay $f_d$ can be expressed by, for example, the following Expression (1), and the loss rate $f_l$ can be expressed by, for example, the following Expression (2).

$$f_d(\rho_{i,j}) = \frac{data}{C_{i,j}} \left\{ \frac{1 - \rho_{i,j}^{K-1}}{(1 - \rho_{i,j})(1 - \rho_{i,j}^{K+1})} - \frac{K\rho_{i,j}^K}{(1 - \rho_{i,j}^{K+1})} \right\} \quad (1)$$

$$f_l(\rho_{i,j}) = \frac{\rho_{i,j}^K(1 - \rho_{i,j})}{1 - \rho_{i,j}^{K+1}} \quad (2)$$

Furthermore, using these characteristic models, quality variation amounts (end-to-end quality influence) for a buffering delay and a loss rate are predicted assuming that the request flow f is routed through individual links. Namely, the quality variation amount of the buffering delay is expressed using a buffering delay prediction function indicated by the following Expression (3).

$$fd(R_{i,j}+B_f) \quad (3)$$

In the same way, the quality variation amount of the loss rate is expressed using a loss rate prediction function indicated by the following Expression (4).

$$f_l(R_{i,j}+B_f) \quad (4)$$

In this regard, however, the $R_{i,j}$ indicates a transfer traffic amount (unit: bps) in the data link (i, j), namely, a current load in the data link (i, j). Accordingly, when the request flow f uses the data link (i, j), the following equations are satisfied.

delay increase=$f_d(R_{i,j}+B_f)$ loss rate increase=$f_l(R_{i,j}+B_f)$

Namely, the constraint condition setting unit 104 estimates end-to-end quality influence for a request flow and another flow by applying traffic influence in a data link due to a flow to the quality variation prediction function.

In addition, in the present embodiment, the optimum path calculation unit 102 performs mathematical calculation on the basis of whether the request flow f is routed through a link coupling each node i to a node j (Xij=1) or not (Xij=0), and calculates xi,j that is a design variable, thereby obtaining an optimum path.

Accordingly, it is necessary to provide a constraint condition used for deriving the design variable (Xij), as an expression including the design variable (Xij). In addition, the end-to-end delay and the end-to-end loss rate can be formulated using the quality variation amount predicted for each node and the design variable (Xij).

Figure 6:
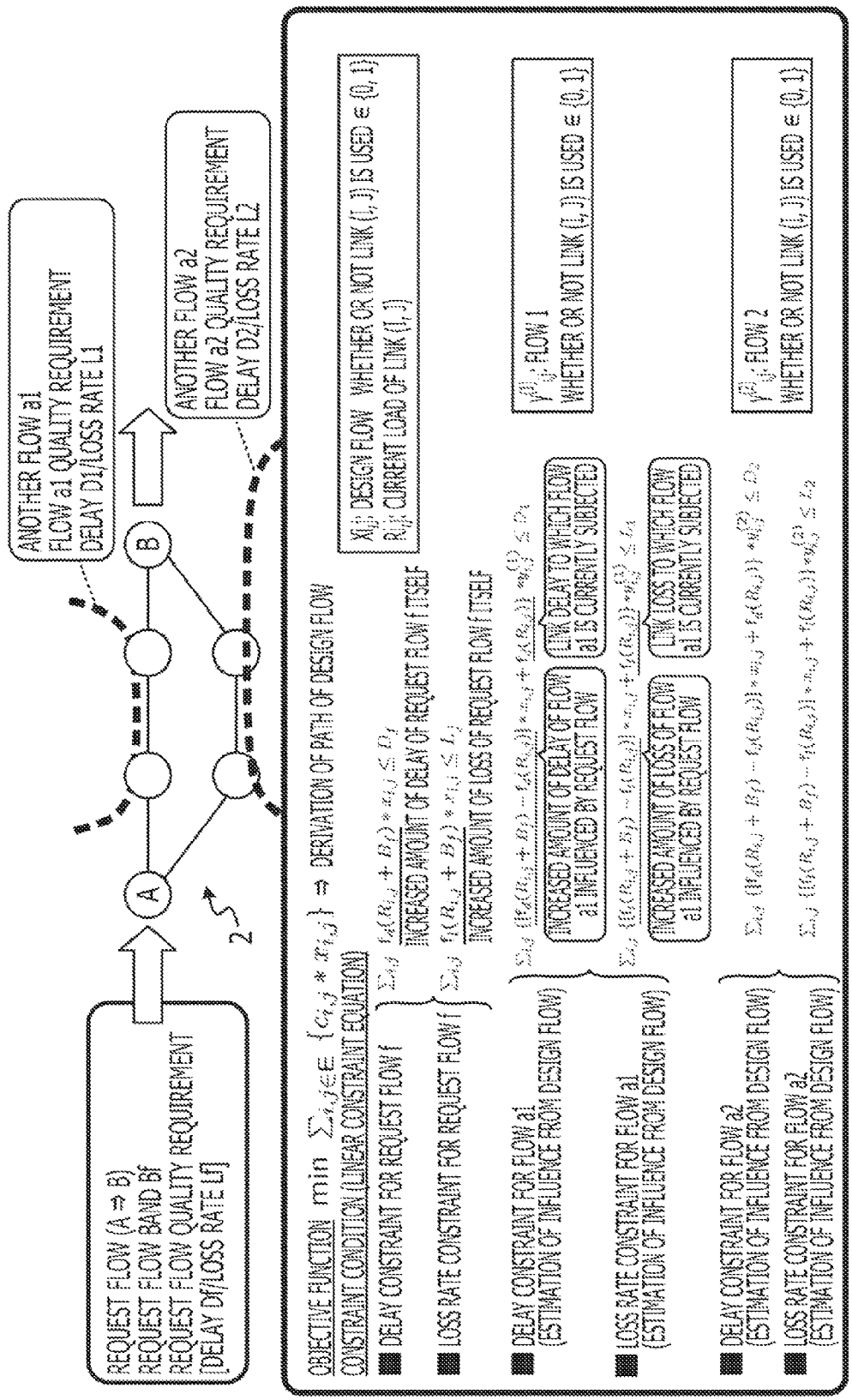
FIG. 6 is a diagram for explaining an objective function and constraint condition expressions used for path calculation for a request flow in a network management system as an example of an embodiment.

FIG. 6 is a diagram for explaining an objective function and constraint condition expressions used for path calculation for a request flow in the network management system as an example of the embodiment.

Using a link cost value $C_{i,j}$ assigned to a link coupling each node i to a node j and the design variable (Xij), the objective function is expressed as the following Expression (5).

$$\min \sum_{i,j \in E} \{c_{i,j} * x_{i,j}\} \quad (5)$$

$\{E : \text{node set}\}$

The objective function illustrated in Expression (5) indicates that a design variable (Xij) which minimizes the summation of link costs is derived. The constraint condition design unit 104 sets the following constraint conditions for the objective function.

[Quality Constraint for Request Flow]
end-to-end delay $$\sum_{i,j} f_d(R_{i,j} + B_f) * x_{i,j} \leq D_f$$

end-to-end loss rate $$\sum_{i,j} f_l(R_{i,j} + B_f) * x_{i,j} \leq L_f$$

In this regard, however, the xi,j indicates whether or not the link (i, j) is used ∈{0, 1} with respect to the request flow f. In addition, in the above-mentioned quality constraint, $f_d(R_{i,j}+B_f)$ indicates the increased amount of delay of the request flow f itself, and $f_l(R_{i,j}+B_f)$ indicates the increased amount of loss of the request flow f itself.

[Quality Constraint for Flow a1]
path information of flow a1:

$$y_{i,j}^{(1)}:\epsilon\{0,1\}$$

end-to-end delay:

$$\sum_{i,j}\{[f_d(R_{i,j}+B_f)-f_d(R_{i,j})]*x_{i,j}+f_d(R_{i,j})\}*y_{i,j}^{(1)} \leq D_1$$

end-to-end loss rate:

$$\sum_{i,j}\{[f_l(R_{i,j}+B_f)-f_l(R_{i,j})]*x_{i,j}+f_l(R_{i,j})\}*y_{i,j}^{(1)} \leq L_1$$

In this regard, however, $y^{(1)}_{i,j}$ indicates whether or not the link (i, j) is used $\epsilon\{0,1\}$ with respect to the flow a1.

In the quality constraint, $f_d(R_{i,j}+B_f)-f_d(R_{i,j})$ indicates the increased amount of delay of the flow a1 influenced by the request flow f, and $f_d(R_{i,j})$ indicates a link delay to which the flow a1 is currently subjected. In addition, $f_l(R_{i,j}+B_f)-f_l(R_{i,j})$ indicates the increased amount of loss of the flow a1 influenced by the request flow f, and $f_l(R_{i,j})$ indicates a link loss to which the flow a1 is currently subjected.

[Quality Constraint for Flow a2]
path information of flow a2:

$$y_{i,j}^{(2)}:\epsilon\{0,1\} \quad (2)$$

end-to-end delay:

$$\sum_{i,j}\{[f_d(R_{i,j}+B_f)-f_d(R_{i,j})]*x_{i,j}+f_d(R_{i,j})\}*y_{i,j}^{(2)} \leq D_2$$

end-to-end loss rate:

$$\sum_{i,j}\{[f_l(R_{i,j}+B_f)-f_l(R_{i,j})]*x_{i,j}+f_l(R_{i,j})\}*y_{i,j}^{(2)} \leq L_2$$

In this regard, however, the $y^{(2)}_{i,j}$ indicates whether or not the link (i, j) is used $\epsilon\{0,1\}$ with respect to a flow a2.

In addition, such quality constraints for the flows a1 and a2 as described above can be generalized and indicated as quality constraints for flows other than the request flow f, as illustrated in the following Expressions (6) and (7).

[Quality Constraint for Other Flows]
It is assumed that k is information used for identifying a flow (k is a natural number greater than or equal to 1).
path information of flow a2:

$$y_{i,j}^{(k)}:\epsilon\{0,1\}$$

end-to-end delay:

$$\sum_{(i,j)\in E, i\neq j}\{(f_d(R_{i,j}+B_f)-f_d(R_{i,j}))x_{i,j}+f_d(R_{i,j})\}\cdot y_{i,j}^{k} \leq D_k \quad (6)$$

end-to-end loss rate:

$$\sum_{(i,j)\in E, i\neq j}\{(f_l(R_{i,j}+B_f)-f_l(R_{i,j}))x_{i,j}+f_l(R_{i,j})\}\cdot y_{i,j}^{k} \leq L_k \quad (7)$$

The all path calculation problems described above are treated using linear expressions, and enables solutions to be derived as 0-1 integer programming problems that derive an optimum design variable (Xij).

In addition, the quality constraint conditions created by the constraint condition design unit 104 as described above are stored, as the constraint condition information 112, in the RAM 11.

The optimum path calculation unit (routing unit) 102 determines, as an optimum path $X\epsilon\{0,1\}$, a path whose cost summation defined in the cost definition table with respect to all links in the path is minimum, within a range satisfying the quality constraint conditions set by the constraint condition design unit 104. Namely, the optimum path calculation unit 102 determines a data link forming a path for the request flow from among a plurality of data links within a range satisfying the quality constraint conditions set by the constraint condition design unit 104.

Specifically, the optimum path calculation unit 102 derives a design variable (Xij) that minimizes the summation of link costs on the basis of the objective function illustrated in Expression (5) described above.

Figure 7:
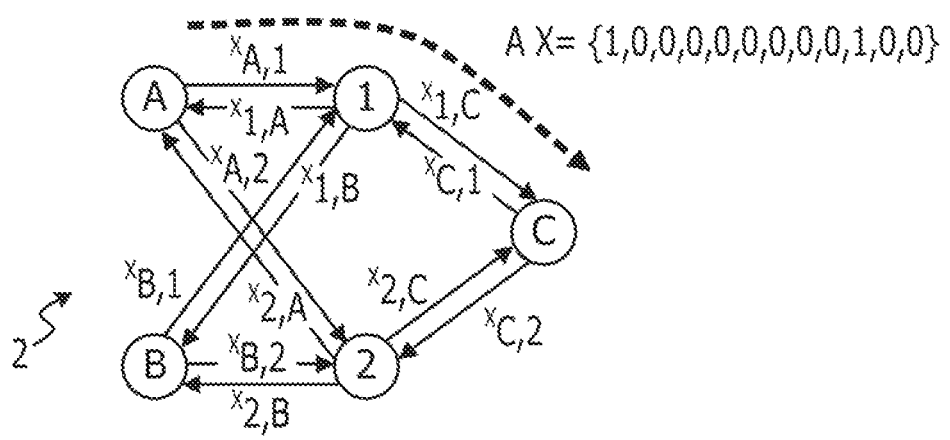
FIG. 7 is a diagram for explaining an expression method for an optimum path in a network management system as an example of an embodiment.

FIG. 7 is a diagram for explaining an expression method for an optimum path in the network management system 1 as an example of the embodiment, and is a diagram illustrating an example of the topology of the network 2.

The optimum path X is indicated by setting a selected data path to "1" and setting a non-selected data path to "0" in a state in which all data path in the network 2 are enumerated, in the way illustrated hereinafter.

For example, in the network topology illustrated in FIG. 7, link information establishing couplings among individual nodes is expressed as follows:

link variable $X=\{x_{A,1}, x_{1,A}, x_{A,2}, x_{2,A}, x_{B,1}, x_{1,B}, x_{B,2}, x_{2,B}, x_{C,1}, x_{1,C}, x_{C,2}, x_{2,C}\}X\epsilon\{0,1\}$ The flow routing unit 110 determines the link variable (0: a request flow is not routed through, 1: a request flow is routed through) every time the request flow f is provided.

For example, in the network topology illustrated in FIG. 7, a path leading from a node A to a node C through a node 1, indicated with an arrow A in FIG. 7, namely, a path routed through links $x_{A,1}$ and $x_{1,C}$ is expressed as X={1, 0, 0, 0, 0, 0, 0, 0, 0, 1, 0, 0}.

The optimum path calculation unit 102 treats, as the 0-1 integer programming problems, the path calculation problems formed as linear expressions as described above and derives solutions.

Accordingly, the optimum path calculation unit 102 derives an optimum design variable (Xij), and calculates an optimum path X. In addition, the determination method for determining an optimum path on the basis of cost summation, performed by the optimum path calculation unit 102, can be realized using various existing methods, and hence the detailed descriptions thereof will be omitted.

The path design unit 106 accommodates the request flow in the network 2 on the basis of the path calculation result obtained by the optimum path calculation unit 102.

The design history management unit 103 manages the path information, the usage bandwidth, and the quality requirements for an end-to-end delay and a loss rate of a flow already set in the network 2.

The design history management unit 103 stores, as the path history information 113, in the RAM 11 information relating to the optimum path determined by the optimum path calculation unit 102. Specifically, the design history management unit 103 stores therein, as the path history information 113, identification information used for identifying the request flow f and the optimum path X calculated by the optimum path calculation unit 10 with respect to the request flow f with associating the identification information with the optimum path X.

For example, the optimum path X={1, 0, 0, 0, 0, 0, 0, 0, 0, 1, 0, 0} for the flow calculated by the optimum path calculation unit 102 is stored as the path history information 113 in the form of $y^{(k)}=\{1, 0, 0, 0, 0, 0, 0, 0, 0, 1, 0, 0\}$.

In addition, the design history management unit 103 stores and manages the usage bandwidth Bf, a quality requirement Df for an end-to-end delay, and a quality requirement Lf for a loss rate in the path history information 113, with respect to the request flow f, as the usage bandwidth Bk, a quality requirement Dk for an end-to-end delay, and a quality requirement Lk for a loss rate, with respect to a flow k, respectively.

In addition, the information managed by the design history management unit 103 is used as information for another already-set flow when a new request flow f is provided and an optimum path for the new request flow f is determined.

Namely, when a path for the new flow is determined, the constraint condition setting unit 104 uses the path history information 113 stored in the RAM 11 for estimating end-to-end quality influence, for another existing flow.

In addition, when the flow is processed, it is desirable to delete the information of the corresponding flow from the path history information 113.

Every time the separation of a path occurs, the constraint condition design unit 104 deletes the end-to-end quality influence as a constraint condition for path calculation.

Figure 8:
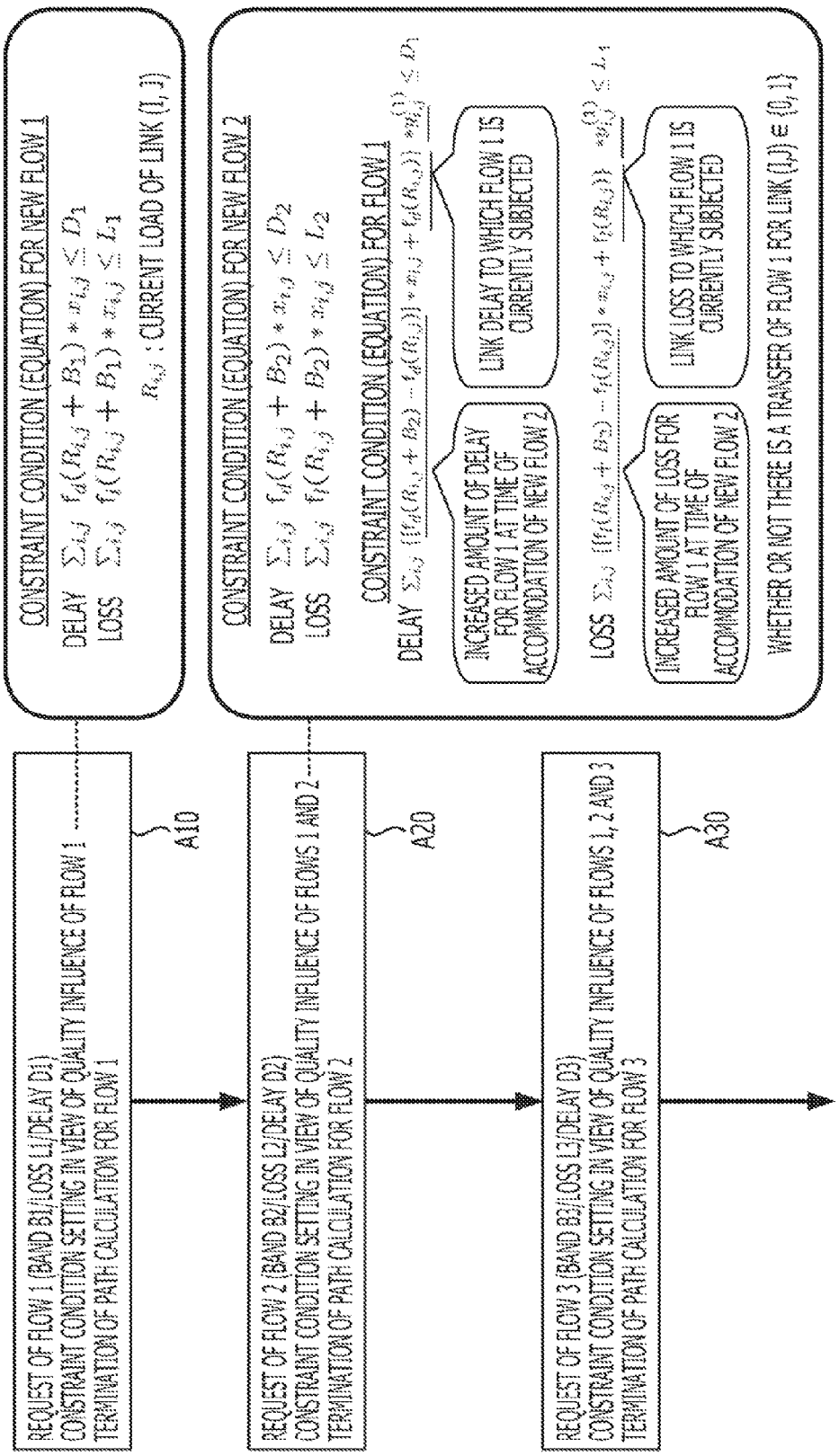
FIG. 8 is a flowchart for explaining a path setting method in a network management system as an example of an embodiment.
Figure 9:
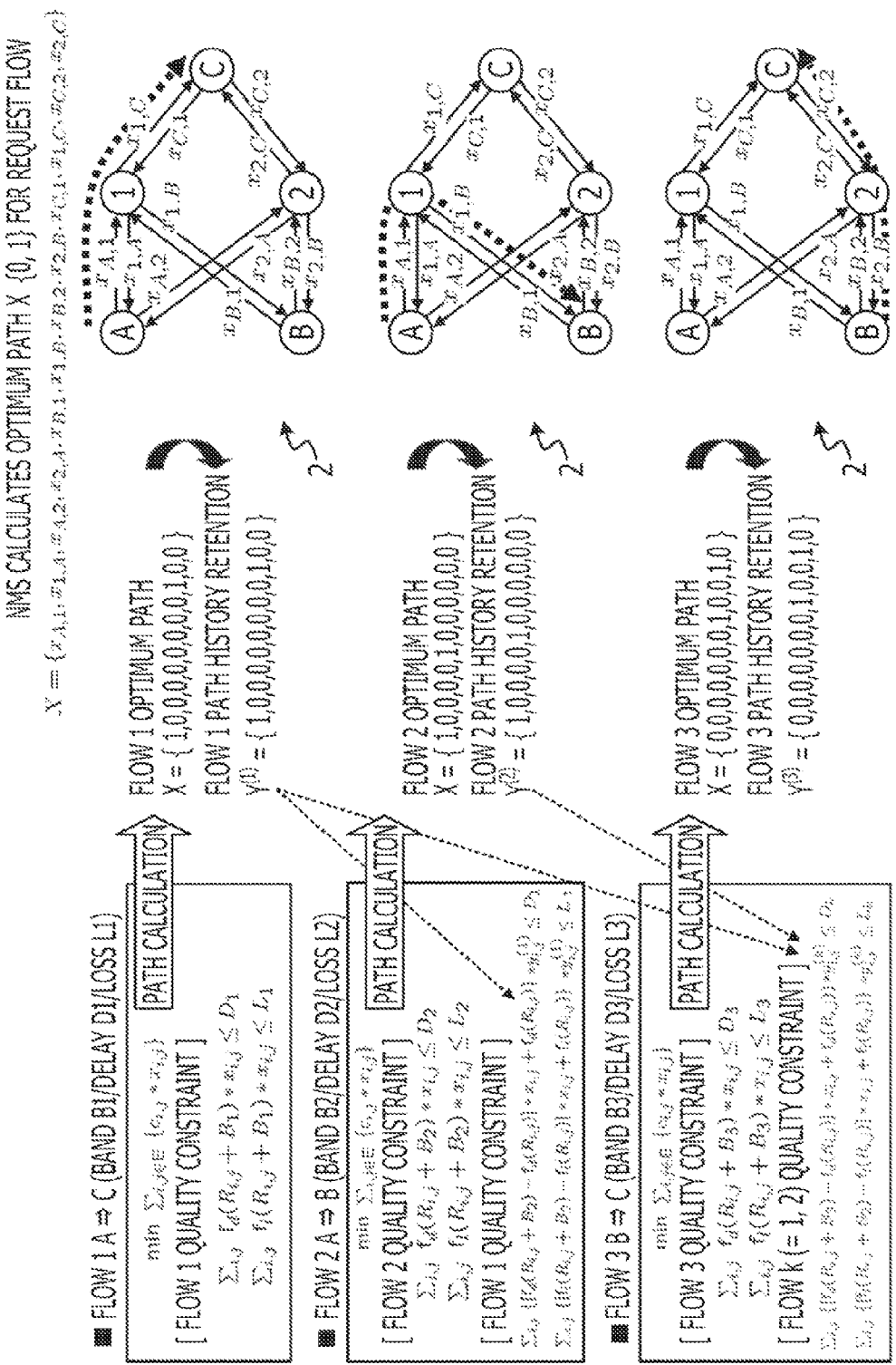
FIG. 9 is a diagram illustrating an optimum path for each flow and a usage method for path history information thereof in a network management system as an example of an embodiment.

Here, a path setting method performed in the network management system as an example of the present embodiment will be described in accordance with a flowchart illustrated in FIG. 8 (Steps A10 to A30) with reference to FIG. 9. In addition, FIG. 9 is a diagram illustrating an optimum path for each flow and a usage method for the path history information 113 thereof. In addition, in the example illustrated in FIG. 8, an example will be described in which the paths of three request flows f, flows 1 to 3, are sequentially set for the network topology illustrated in FIG. 7.

In the topology that includes nodes A, B, and C to be entries and exits for traffic and relay nodes 1 and 2 relaying traffic, as illustrated in FIG. 7, link information establishing couplings among individual nodes is expressed as described above, using the following form:

link variable X={$x_{A,1}$, $x_{1,A}$, $x_{A,2}$, $x_{2,A}$, $x_{B,1}$, $x_{1,B}$, $x_{B,2}$, $x_{2,B}$, $x_{C,1}$, $x_{1,C}$, $x_{C,2}$, $X_{2,C}$}

(1) First Flow (Step A10)

First, a process will be illustrated in which a first flow is set under an environment where no flow is accommodated in the network 2. It is assumed that a flow 1, which has a usage bandwidth B1, an end-to-end delay quality requirement D1, and an end-to-end loss rate quality requirement L1 and travels from the node A to the node C, is requested.

The constraint condition design unit 104 generates the quality constraint conditions of the flow 1.
delay:

$$\sum_{i,j} f_d(R_{i,j} + B_1) * x_{i,j} \le D_1$$

loss rate:

$$\sum_{i,j} f_l(R_{i,j} + B_1) * x_{i,j} \le L_1$$

In addition, using the following objective function, the optimum path calculation unit 102 derives the path of the flow 1, which minimizes the summation of link cost values $c_{i,j}$ within a range satisfying the quality constraint conditions thereof.

objective function $$\min \sum_{i,j \in E} \{c_{i,j} * x_{i,j}\}$$

In the example illustrated in FIG. 9, an optimum path X={1, 0, 0, 0, 0, 0, 0, 0, 1, 0, 0} is derived. The result indicates that the flow 1 is routed through the data links $x_{A,1}$ and $x_{1,C}$.

In the management server 10, the path design unit 106 accommodates the flow 1 in the network on the basis of the path calculation result. In addition, the design history management unit 103 performs history management with treating path information as $y^{(1)}$={1, 0, 0, 0, 0, 0, 0, 0, 1, 0, 0}.

(2) Second Flow (Step A20)

It is assumed that the flow 1 has become another already-set flow and furthermore, a flow 2, which has a usage bandwidth B2, an end-to-end delay quality requirement D2, and an end-to-end loss rate quality requirement L2 and travels from the node A to the node B, is requested.

The constraint condition design unit 104 generates the quality constraint conditions of the flow 2.
delay:

$$\sum_{i,j} f_d(R_{i,j} + B_2) * x_{i,j} \le D_2$$

loss rate:

$$\sum_{i,j} f_l(R_{i,j} + B_2) * x_{i,j} \le L_2$$

Furthermore, the constraint condition design unit 104 generates quality constraint conditions for the flow 1.
delay:

$$\sum_{i,j} \{[f_d(R_{i,j} + B_2) - f_d(R_{i,j})]x_{i,j} + f_d(R_{i,j})\} * y_{i,j}^{(1)} \le D_1$$

loss rate:

$$\sum_{i,j} \{[f_l(R_{i,j} + B_2) - f_l(R_{i,j})]x_{i,j} + f_l(R_{i,j})\} * y_{i,j}^{(1)} \le L_1$$

In addition, using the following objective function, the optimum path calculation unit 102 derives the path of the flow 2, which minimizes the summation of link cost values $c_{i,j}$ within a range satisfying the quality constraint conditions of the already-set flow 1 and the request flow 2.
objective function $$\min \sum_{i,j \in E} \{c_{i,j} * x_{i,j}\}$$

In the example illustrated in FIG. 9, an optimum path X={1, 0, 0, 0, 0, 1, 0, 0, 0, 0, 0, 0} is derived. The result indicates that the flow 2 is routed through the data links $x_{A,1}$ and $x_{1,B}$.

In the management server 10, the path design unit 106 accommodates the flow 2 in the network on the basis of the path calculation result. In addition, the design history management unit 103 performs history management with treating path information as $y^{(2)}=\{1, 0, 0, 0, 0, 1, 0, 0, 0, 0, 0, 0\}$.

(3) Third Flow (Step A30)

It is assumed that the flows 1 and 2 have become other already-set flows and furthermore, a flow 3, which has a usage bandwidth B3, an end-to-end delay quality requirement D3, and an end-to-end loss rate quality requirement L3 and travels from the node B to the node C, is requested.

The constraint condition design unit 104 generates the quality constraint conditions of the flow 3.
delay:

$$\sum_{i,j} f_d(R_{i,j} + B_3) * x_{i,j} \le D_3$$

loss rate:

$$\sum_{i,j} f_l(R_{i,j} + B_3) * x_{i,j} \le L_3$$

Furthermore, the constraint condition design unit 104 generates quality constraint conditions for the flow k (k=1, 2).
delay:

$$\sum_{i,j} \{[f_d(R_{i,j} + B_2) - f_d(R_{i,j})] * x_{i,j} + f_d(R_{i,j})\} * y_{i,j}^{(k)} \le D_k$$

loss rate:

$$\sum_{i,j} \{[f_l(R_{i,j} + B_2) - f_l(R_{i,j})] * x_{i,j} + f_l(R_{i,j})\} * y_{i,j}^{(k)} \le L_k$$

In addition, using the following objective function, the optimum path calculation unit 102 derives the path of the flow 3, which minimizes the summation of link cost values $c_{i,j}$ within a range satisfying the quality constraint conditions of the request flow 3 and the quality constraint conditions of the already-set flows 1 and 2.
objective function $$\min \sum_{i,j \in E} \{c_{i,j} * x_{i,j}\}$$

In the example illustrated in FIG. 9, an optimum path X={0, 0, 0, 0, 0, 0, 0, 1, 0, 0, 1, 0} is derived. The result indicates that the flow 3 is routed through the data links $x_{B,2}$ and $x_{2,C}$.

In the management server 10, the path design unit 106 accommodates the flow 3 in the network on the basis of the path calculation result. In addition, the design history management unit 103 performs history management with treating path information as $y^{(3)}=\{0, 0, 0, 0, 0, 0, 0, 1, 0, 0, 1, 0\}$.

Figure 10:
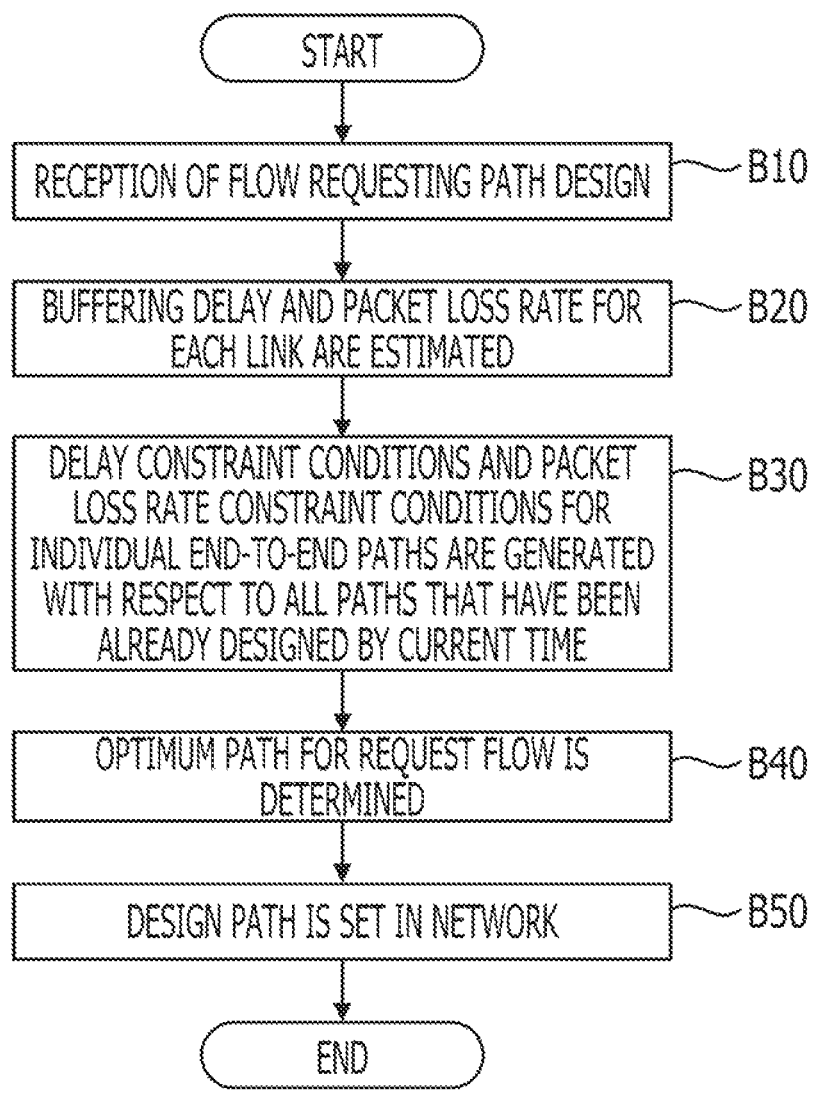
FIG. 10 is a flowchart for explaining a flow of a path setting processing operation for a request flow in a network management system as an example of an embodiment.

The flow of a path setting processing operation for the request flow f performed in the network management system configured as described above as an example of the present embodiment will be described in accordance with a flowchart illustrated in FIG. 10 (Steps B10 to B50).

When the management server 10 receives a request flow from a transmission source node in the network 2 (Step B10), the constraint condition design unit 104 estimates a buffering delay and a packet loss rate in each data link (Step B20). Namely, the constraint condition design unit 104 estimates a buffering delay and a packet loss rate that occur in a link (i,j) when it is assumed that a path for the request flow f is accommodated in the link (i,j).

These buffering delay and packet loss rate can be calculated using, for example, a queuing model typified by M/M/1/K or a table preliminarily created on the basis of actual measurement data.

Next, the constraint condition design unit 104 generates constraint conditions relating to delays and packet loss rates for individual end-to-end paths with respect to all paths that have been already designed in the network 2 by the time (Step B30: Constraint Condition Setting Step). In addition, the detailed processing operation performed in Step B30 will be described hereinafter (refer to FIG. 11).

In addition, the optimum path calculation unit 102 determines, as an optimum path, a path whose cost summation defined in the cost definition table with respect to all links in the path is minimum, within a range satisfying the quality constraint conditions set by the constraint condition design unit 104 (Step B40: Path Determination Step).

The path design unit 106 sets the optimum path, determined by the optimum path calculation unit 102, in the network 2 (Step B50). In addition, information relating to the determined optimum path is stored as the path history information 113 in the RAM 11 (Path History Information Storing Step). After that, the processing operation is terminated.

Figure 11:
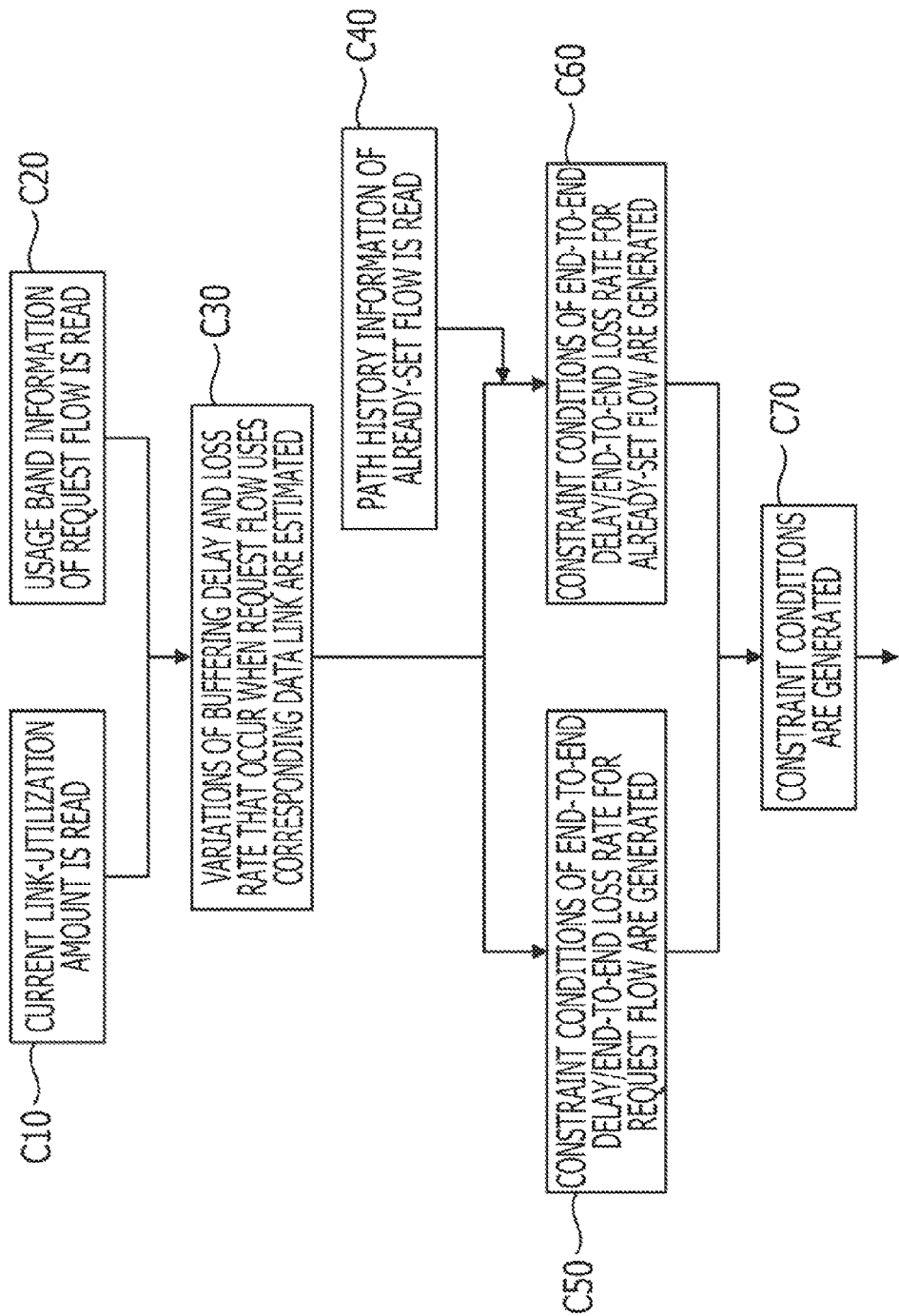
FIG. 11 is a flowchart for explaining a design method for a constraint condition in a network management system as an example of an embodiment.

Next, a design method for a constraint condition performed in the network management system 1 as an example of the present embodiment will be described in accordance with a flowchart illustrated in FIG. 11 (Steps C10 to C70).

The constraint condition design unit 104 reads from the state measurement unit 105 individual link utilization amounts (transfer traffic amounts) at the time with respect to all data links included in the network 2 (Step C10). In addition, the constraint condition design unit 104 reads the usage bandwidth information Bf from the request flow f transmitted from the transmission source node (Step C20).

The constraint condition design unit 104 estimates the variations of a buffering delay and a loss rate that occur when the request flow f uses the data link (Step C30). In addition, the constraint condition design unit 104 reads from the RAM 11 the path history information 113 relating to a flow already set in the network 2 (another already-set flow) (Step C40).

In addition, the constraint condition design unit 104 generates the constraint condition of an end-to-end delay and the constraint condition of an end-to-end loss rate with respect to the request flow f (Step C50). In addition, the constraint condition design unit 104 generates the constraint condition of an end-to-end delay and the constraint condition of an end-to-end loss rate with respect to the other flow already set in the network 2 (Step C60).

The constraint condition design unit 104 transfers, as constraint conditions, to the optimum path calculation unit 102 the constraint conditions individually generated in Step C50 and Step C60 (Step C70).

Figure 12:
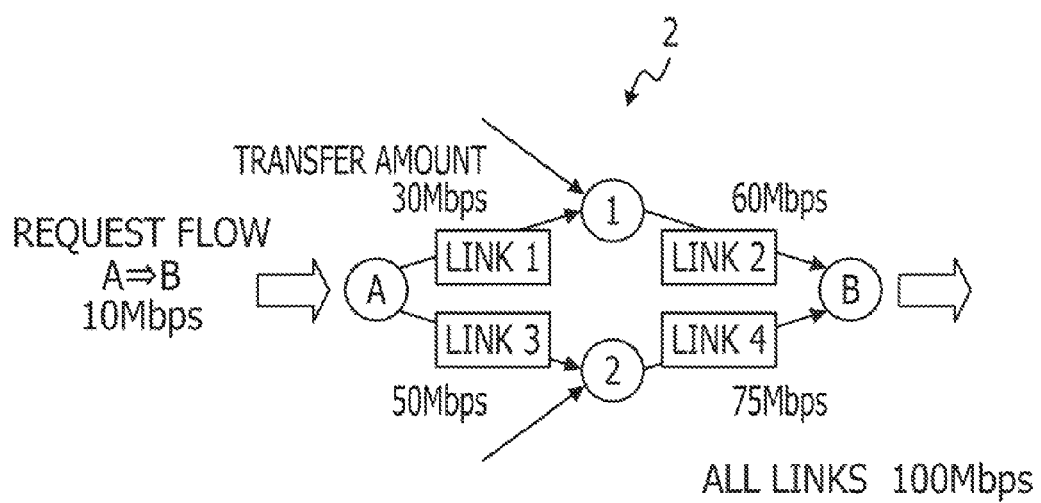
FIG. 12 is a diagram illustrating an example of a configuration of a network topology.

FIG. 12 is a diagram illustrating an example of the configuration of the topology of the network 2, and FIG. 13 is a diagram exemplifying, in the form of a table, data generated in the management system 1 with respect to the topology illustrated in FIG. 12.

In the topology exemplified in FIG. 12, a node 1 and a node 2 are disposed between a node A and a node B. In addition, in the example illustrated in FIG. 12, a data link $x_{A,1}$, data $x_{1,B}$, data link $x_{A,2}$, and data $x_{2,B}$ are expressed as a Link 1, a Link 2, a Link 3, and a Link 4, respectively.

In addition, in the example illustrated in FIG. 12, it is assumed that the maximum capacity of each of the Links 1 to 4 is 100 Mbps. In addition, a traffic amount of 30 Mbps flows in the Link 1, and in substantially the same way, traffic amounts of 60 Mbps, 50 Mbps, and 75 Mbps flow in the Link 2, the Link 3, and the Link 4, respectively.

In addition, in the example illustrated in FIG. 12, it is assumed that a setting request for the request flow f the usage bandwidth of which is 10 Mbps is made from the transmission source node A to the transmission destination node B.

FIG. 13 is a diagram exemplifying the link attribute information 114 generated in the network management system 1 as an example of the embodiment. The link attribute information 114 includes various kinds of information generated when the above-mentioned constraint condition design unit 104 sets the quality constraint conditions, and the example illustrated in FIG. 13 exemplifies the pieces of information in the form of a table. The constraint condition design unit 104 sequentially stores the pieces of information in a predetermined area in the RAM 11.

In the example illustrated in FIG. 13, the link attribute information 114 includes, as link attributes, "link capacity", a "current transfer traffic amount", a "current delay amount", a "current loss rate", an "increased amount of flow request-time traffic amount", a "flow request-time predicted traffic amount", a "flow request-time predicted delay amount", an "increased amount of flow request-time predicted delay amount", a "flow request-time predicted loss rate", and an "increased amount of flow request-time predicted loss rate".

Here, for example, the constraint condition design unit 104 applies the "current transfer traffic amount" to the function $f_d$ ($\rho_i$) relating to a delay amount, which is a queuing model typified by M/M/1/K, and hence the "current delay amount" and the "current loss rate" are calculated.

The constraint condition design unit 104 adds the "increased amount of flow request-time traffic amount" to the "current transfer traffic amount", and hence the "flow request-time predicted delay amount" is calculated.

For example, the constraint condition design unit 104 applies the "flow request-time predicted traffic amount" to the function $f_d$ ($\rho_i$) relating to a delay amount, which is a queuing model typified by M/M/1/K, and hence the "flow request-time predicted delay amount" is calculated. The constraint condition design unit 104 subtracts the "current delay amount" from the "flow request-time predicted delay amount", and hence the "increased amount of flow request-time predicted delay amount" is calculated.

For example, the constraint condition design unit 104 applies the "flow request-time predicted traffic amount" to the function $f_l$ ($\rho_i$) relating to a loss rate, which is a queuing model typified by M/M/1/K, and hence the "flow request-time predicted loss rate" is calculated. The constraint condition design unit 104 subtracts the "current loss rate" from the "flow request-time predicted loss rate", and hence the "increased amount of flow request-time loss rate" is calculated.

In addition, the path history information 113 provides these pieces of information (link characteristics) for each data link included in the network 2.

Figure 14:
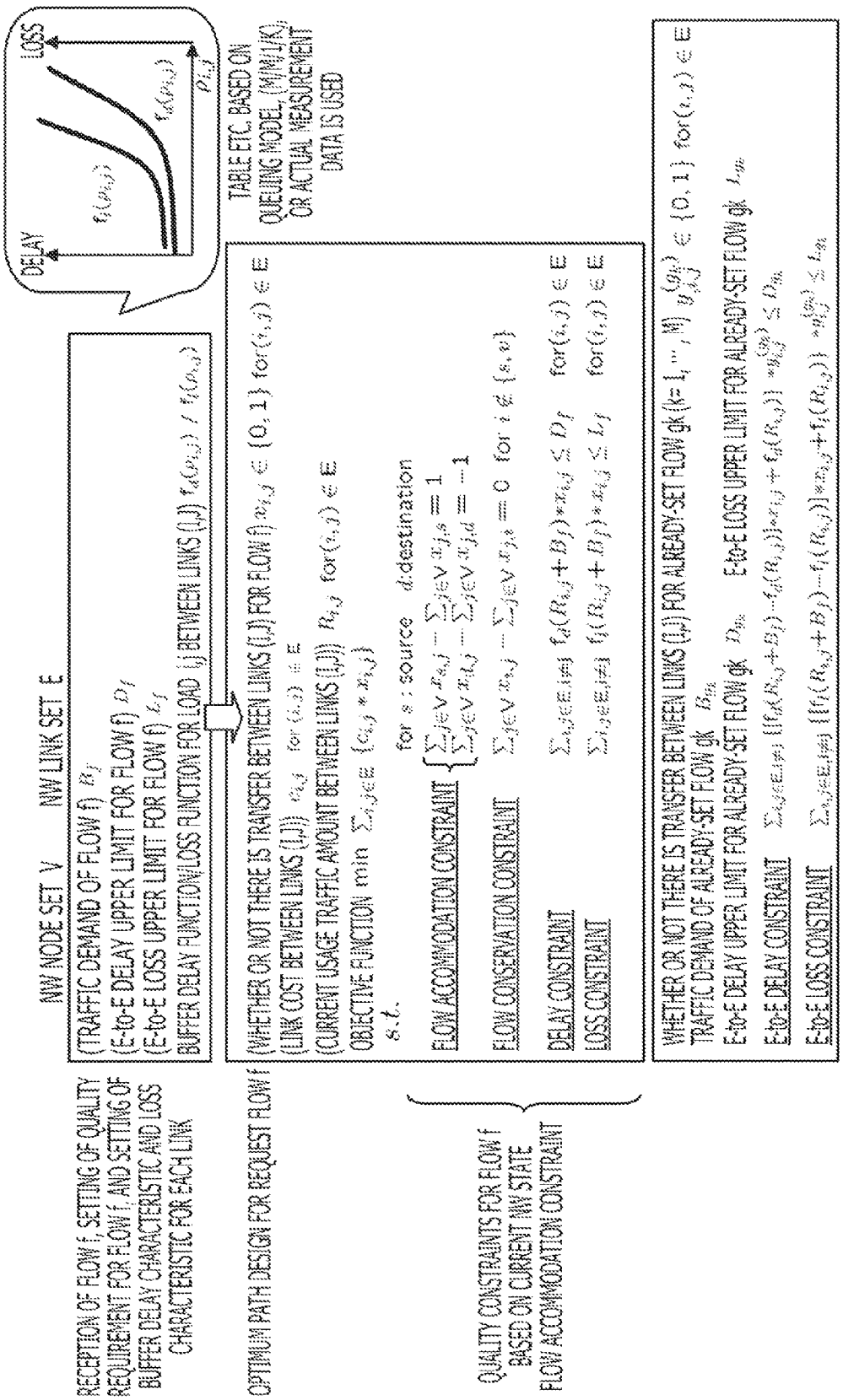
FIG. 14 is a diagram for explaining a generation method for a constraint condition performed in a constraint condition design unit in a network management system as an example of an embodiment.

A generation method for a constraint condition performed in the constraint condition design unit 104 in the network management system 1 as an example of the embodiment is formulated and illustrated in FIG. 14. In addition, a node set in the network 2 is defined as V, and a link set in the network 2 is defined as E.

The constraint condition design unit 104 receives the flow f, and sets a quality requirement for the flow f and the buffer delay characteristic and loss characteristic of each link. Namely, the settings are as follows.

Bf: the traffic demand of the flow f
Df: an end-to-end delay upper limit for the flow f
Lf: an end-to-end loss upper limit for the flow f
$f_d(\rho_{i,j})/f_l(\rho_{i,j})$: a buffer delay function/a loss function for a load $\rho_{i,j}$ between a link (i,j)

The optimum path calculation unit 102 generates the following expressions as an optimum path design for the request flow f. Namely, the expressions are as follows.

$x_{i,j} \in \{0, 1\}$ for (i,j)∈E: whether or not there is a transfer between links (i,j) for the flow f
$c_{i,j}$ for (i,j)∈E: a link cost between links (i,j)
$R_{i,j}$ (i,j)∈E: a current usage traffic amount between links (i,j)

Furthermore, an objective function is as follows.
objective function $$\min \sum_{i,j \in E} \{c_{i,j} * x_{i,j}\}$$

Here, constraint conditions (s.t.) are derived as follows on the basis of quality constraints for the flow f based on the current state of the network 2.

First, a flow accommodation constraint is derived as follows on the basis that the total amount of flow volume is conserved (flow volume conservation condition) between a source node s and a destination node (s: source and d: destination).

$$\begin{cases} \sum_{j \in \vee x_{s,j}} - \sum_{j \in \vee x_{j,s}} = 1 \\ \sum_{j \in \vee x_{d,j}} - \sum_{j \in \vee x_{j,d}} = -1 \end{cases}$$

In addition, a flow conservation constraint is derived as follows.

$$\sum_{j \in V} x_{i,j} - \sum_{j \in V} x_{j,i} = 0$$

for $i \notin \{s, v\}$

In addition, a delay constraint is derived as follows.

$$\sum_{i,j \in E, i \neq j} f_d(R_{i,j} + B_f) * x_{i,j} \leq D_f$$

for $(i, j) \in E$

In addition, a loss constraint is derived as follows.

$$\sum_{i,j \in E, i \neq j} f_l(R_{i,j} + B_f) * x_{i,j} \leq L_f$$

for $(i, j) \in E$

Furthermore, whether or not there is a transfer between links (i,j) for an already-set flow gk (k=1, . . . , M) is defined as follows.

$y_{i,j}^{(gk)} \in \{0,1\}$ for (i,j)∈E

In addition, a traffic demand of the already-set flow gk is defined as $B_{g_k}$, an end-to-end delay upper limit for the already-set flow gk is defined as $D_{g_k}$, an end-to-end loss upper limit for the already-set flow gk is defined as $L_{g_k}$, and an end-to-end delay constraint is defined as follows.

$$\sum_{i,j \in E, i \neq j} \{[f_d(R_{i,j} + B_f) - f_d(R_{i,j})] * x_{i,j} + f_d(R_{i,j})\} * y_{i,j}^{(g_k)} \leq D_{g_k}$$

In addition, an end-to-end loss constraint is defined as follows.

$$\sum_{i,j \in E, i \neq j} \{[f_l(R_{i,j} + B_f) - f_l(R_{i,j})] * x_{i,j} + f_l(R_{i,j})\} * y_{i,j}^{(g_k)} \leq L_{g_k}$$

In addition, a program (network management program) used for realizing functions as the optimum path calculation unit 102, the design history management unit 103, the constraint condition design unit 104, the state measurement unit 105, and the path design unit 106, described above, is provided, for example, in a form in which the program is recorded in a computer-readable recording medium such as a flexible disk, a CD (CD-ROM, CD-R, CD-RW, or the like), a DVD (DVD-ROM, DVD-RAM, DVD-R, DVD+R, DVD-RW, DVD+RW, HD DVD, or the like), a blu-ray disc, a magnetic disk, an optical disk, a magneto optical disk, or the like. In addition, a computer reads out and transfers the program from the recording medium to an internal storage device or an external storage device, and stores and uses the program. In addition, for example, the program may be stored in a storage device (recording medium) such as a magnetic disk, an optical disk, a magneto optical disk, or the like, and may be provided to the computer from the storage device through a communication path.

When the functions as the optimum path calculation unit 102, the design history management unit 103, the constraint condition design unit 104, the state measurement unit 105, and the path design unit 106 are realized, the program stored in the internal storage device (the RAM 11 or the ROM 12 in the present embodiment) is executed by a microprocessor (the CPU 101 in the present embodiment) in the computer. At this time, the computer may read out and execute the program stored in a recording medium.

In addition, in the present embodiment, the term "computer" is a concept including hardware and an operating system, and indicates the hardware that operates under control of the operating system. In addition, when the operating system is unnecessary and an application program by itself causes the hardware to operate, the hardware itself corresponds to the computer. The hardware includes at least a microprocessor such as a CPU or the like and means for reading out a computer program recorded in a recording medium, and the management server 10 includes a function as the computer in the present embodiment.

In this way, according to the network management system 1 as an example of the embodiment, an optimum path, which satisfies end-to-end quality requirements for individual flows including an already-set flow and the link cost summation of which is minimum, can be determined with respect to a flow for which an addition request is newly made.

In addition, the constraint condition design unit 104 formulates, as linear equations, the end-to-end loss rates and end-to-end delays of the request flow f and the other flow on the basis of relationship models of "a load and a delay" and "a load and a packet loss" in each data link in the network 2.

Accordingly, using the linear objective functions and the linear constraint expressions for identifying a path the summation of link costs of which is minimum, the optimum path calculation unit 102 leads to the 0-1 integer programming problem and performs path calculation. Accordingly, it is possible to reduce a calculation amount and calculate an optimum path in a short time. In particular, in a network including a number of nodes, it is also possible to calculate an optimum path in a short time.

In addition, the disclosed techniques are not limited to the embodiment but various modifications may be implemented insofar as they are within the scope of the present embodiment.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A routing apparatus that determines a path for a flow in a network including a plurality of nodes coupled through a plurality of data links, the routing apparatus comprising:
    a processor configured to
    generate a constraint condition that has a requirement that an end-to-end quality requirement of the flow is satisfied based on a quality variation occurring in each of the data links owing to the allocation of the flow to each of the data links and another requirement that an end-to-end quality requirement of another flow existing in each of the data links is satisfied based on a quality variation occurring in the another flow owing to the allocation of the flow to each of the data links, and
    to determine the path for the flow from among a plurality of paths including the data links within a range satisfying the constraint condition set by the constraint condition setting unit; and
    a storage configured to store, as path history information, information related to a data link forming the path for the flow, determined by the processor, wherein
    the processor is further configured to estimate end-to-end quality influence for the flow and the another flow by applying a traffic influence in the data link due to the flow to a quality variation prediction function, and
    when a path for a new flow is determined, the processor uses the path history information stored in the storage, for estimating the end-to-end quality influence for the another existing flow.

2. The routing apparatus according to claim 1, wherein the processor individually estimates the end-to-end quality influence for the flow and the another flow existing in the network based on the traffic influence for each of the data links due to the flow, and sets, as the constraint condition, a linear constraint equation relating to end-to-end quality of the flow and the another flow.

3. The routing apparatus according to claim 1, wherein the processor sets the constraint condition based on the end-to-end quality influence for the flow and the another flow each time a path for the flow is determined.

4. The routing apparatus according to claim 1, wherein every time a separation of a path occurs, the processor deletes end-to-end quality influence as a constraint condition for a path calculation.

5. The routing apparatus according to claim 1, wherein the end-to-end quality requirement is an end-to-end delay time.

6. The routing apparatus according to claim 1, wherein the end-to-end quality requirement is an end-to-end data loss rate.

7. A routing method for determining a path for a flow in a network including a plurality of nodes coupled through a plurality of data links, the routing method comprising:
setting a constraint condition that has a requirement that an end-to-end quality requirement of the flow is satisfied based on a quality variation occurring in each of the data link owing to the allocation of the flow to each of the data link and another requirement that an end-to-end quality requirement of another flow existing in each of the data link is satisfied based on a quality variation occurring in the another flow owing to the allocation of the flow to each of the data link;
routing the path for the flow by determining the path for the flow from among a plurality of paths including the data links within a range satisfying the constraint condition set in the constraint condition setting step; and
storing, as path history information in a memory, information related to a data link forming the path for the flow, wherein
in setting the constraint condition, end-to-end quality influence for the flow and the another flow is estimated by applying a traffic influence in the data link due to the flow to a quality variation prediction function, and
when a path for a new flow is determined, using the path history information for estimating the end-to-end quality influence for the another existing flow.

8. The routing method according to claim 7, wherein
in setting the constraint condition, the end-to-end quality influence for the flow and the another flow existing in the network is individually estimated based on the traffic influence for each of the data links due to the flow, and a linear constraint equation relating to end-to-end quality of the flow and the another flow is set as the constraint condition; and
in the routing, the path for the flow is determined from among the plurality of paths including the data links within a range satisfying the constraint condition.

9. The routing method according to claim 7, wherein
in setting the constraint condition, the constraint condition is set based on the end-to-end quality influence for the flow and the another flow is set each time a path for the flow is determined.

10. The routing method according to claim 7, wherein
in setting the constraint condition, every time a separation of a path occurs, end-to-end quality influence is deleted as a constraint condition for a path calculation.

11. The routing method according to claim 7, wherein
the end-to-end quality requirement is an end-to-end delay time.

12. The routing method according to claim 7, wherein
the end-to-end quality requirement is an end-to-end data loss rate.

13. A non-transitory computer-readable storage medium storing a routing program used for causing a computer to execute a function for determining a path for a flow in a network including a plurality of nodes coupled through a plurality of data links, the routing program causing the computer to execute:
setting a constraint condition that has a requirement that an end-to-end quality requirement of the flow is satisfied based on a quality variation occurring in each of the data link owing to the allocation of the flow to each of the data link and another requirement that an end-to-end quality requirement of another flow existing in each of the data link is satisfied based on a quality variation occurring in the another flow owing to the allocation of the flow to each of the data link;
routing to determine a path for the flow from among a plurality of paths including the data links within a range satisfying the set constraint condition; and
storing, as path history information, information related to a data link forming the path for the flow, wherein
in setting the constraint condition, end-to-end quality influence for the flow and the another flow is estimated by applying a traffic influence in the data link due to the flow to a quality variation prediction function, and
when a path for a new flow is determined, using the path history information for estimating the end-to-end quality influence for the another existing flow.

14. The non-transitory computer-readable storage medium according to claim 13, wherein
in setting the constraint condition, end-to-end quality influence for the flow and the another flow existing in the network is individually estimated based on the traffic influence for each of the data links due to the flow, and a linear constraint equation relating to end-to-end quality of the flow and the another flow is set as the constraint condition; and
in the routing, the path for the flow is determined from among the plurality of paths including the data links within a range satisfying the constraint condition.

* * * * *